May 7, 1957

W. G. SCHUMAKER ET AL 2,791,465

HINGED FINISH MOLDING

Filed Nov. 4, 1954

Inventors
Walter G. Schumaker &
Robert C. Stone

By Paul Fitzpatrick
Attorney

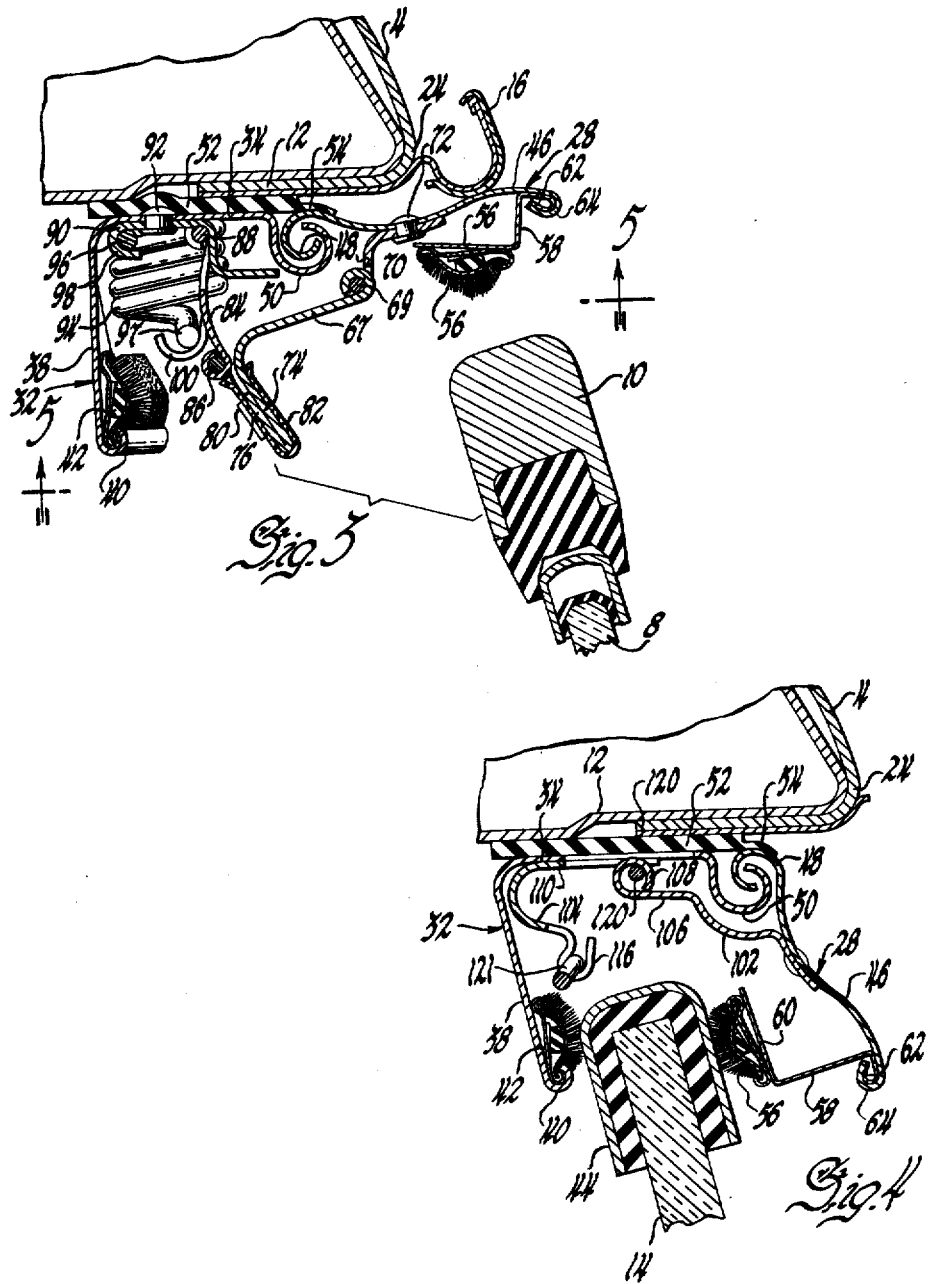

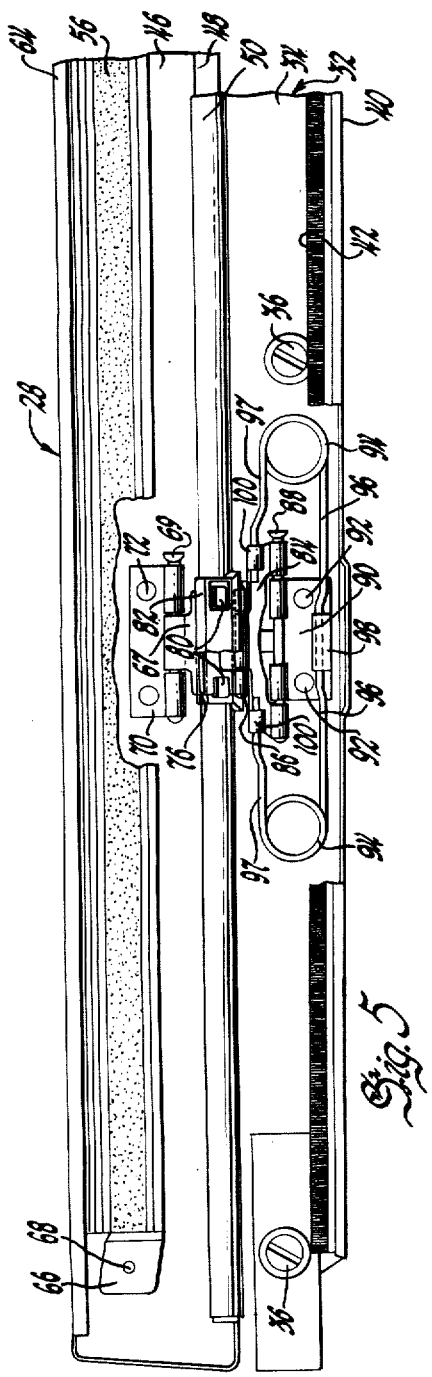
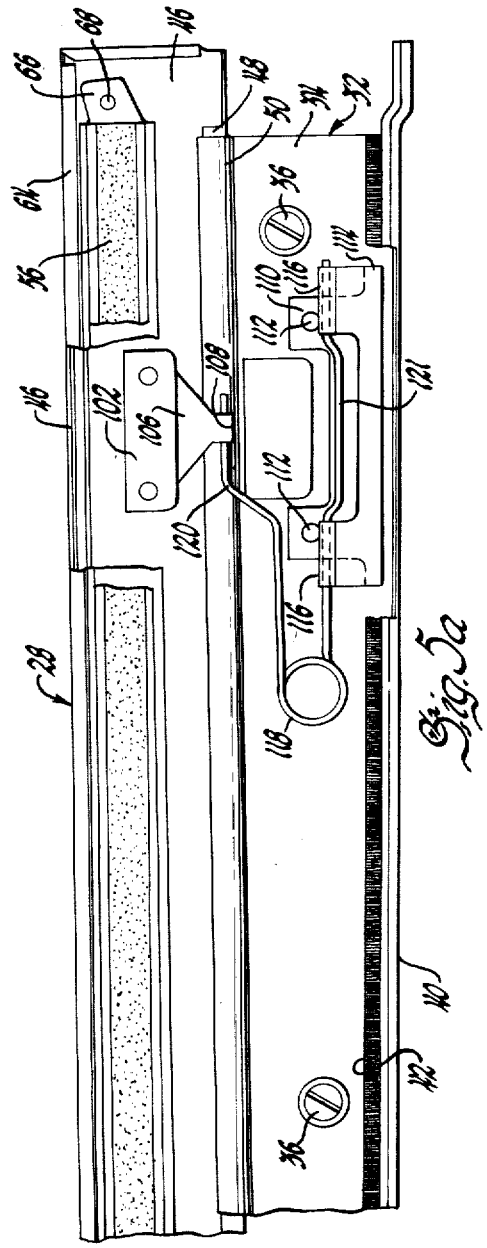

2,791,465

HINGED FINISH MOLDING

Walter G. Schumaker, Livonia, and Robert A. Stone, Birmingham, Mich., assignors to General Motors Corporation, Detroit, Mich., a corporation of Delaware Application November 4, 1954, Serial No. 466,774

10 Claims. (Cl. 296—44.5)

This invention relates to a hinged finish molding for an automobile and more particularly to a hinged finish molding for an automobile having a swingable door and a door window moving vertically between open and closed positions with respect to a door header.

Automobile bodies of the "hard top" type usually have a swingable door, a ventilation window pivotally mounted in a fixed window frame extending upwardly from the forward part of the door to the roof rail, and a vertically moving window rearwardly of the ventilation window. The door header on the roof rail serves as a window header for the vertically moving window, since there is no window header on the door for this window.

This invention provides improvements in a hinged finish molding shown in Wernig Patent 2,631,887. In this type of hinged finish molding, a supporting member mounted on the door header has a depending flange carrying an inner weather strip. A swingable strip hinged to the supporting member carries an outer weather strip in opposed spaced relationship to the inner weather strip in the downwardly extending position of the swingable strip. The opposed spaced weather strips constitute a glass channel to seal the upper edge of the window in its raised position.

One of the improvements of this invention is in the spatial relationship between the window and the swingable strip. The outer edge of the roof rail is outwardly curved from the rear quarter area to the front pillar, and the finish molding providing the glass channel for the rear quarter window follows the curve of the roof rail. This invention now provides a swingable strip which continues the finish molding curve from the rear quarter window to the front pillar. The width of the hinged finish molding varies from its joint at the rear quarter finish molding to the front pillar and the hinged finish molding is of generally tapered cross section. The hinge line of the swingable strip also follows the finish molding curve rather than being parallel to the plane of movement of the vertically opening window.

Thus, this invention provides a swingable strip which greatly enhances the appearance of the automobile by continuing the finish molding curve to the front pillar instead of the strip being parallel to the plane of movement of the vertically moving window. The noticeable set back of the swingable strip from the roof rail edge has been materially decreased and is almost indistinguishable.

Another of the improvements of this invention is in the weather strip between the supporting member and the door header and the hinge connection between the swingable strip and the supporting member. The depending flange of the weather strip which seals the hinge connection has been reduced in extent so that no part of the flange overhangs the swingable strip where it is easily noticeable because of the contrast between the flange and the finish of the swingable strip and also because of the lack of such a flange in the rear quarter area. The hinge connection is totally within the finish molding structure and no part of the hinge can be seen when the swingable strip is in its downwardly extending position.

A further improvement of this invention is in the weather stripping on the swingable strip which cooperates with other weather stripping in opposed spaced relationship to seal the vertically moving window in its closed position. In order to provide an effective seal such weather stripping must be parallel to the plane of movement of the window. Since the swingable strip is not parallel to this plane of movement, a bracket member of generally tapered cross section having an edge portion parallel to the plane of movement of the window is used to mount the weather stripping on the swingable strip.

The principal object of this invention is to improve the appearance of an automobile of the type described by providing a hinged finish molding including a swingable strip which continues the finish molding curve from the rear quarter area to the front pillar. Another object of this invention is to improve the appearance of an automobile of the type described by providing a weather strip which seals the hinge connection of the finish molding and which cannot be readily seen. A further object of this invention is to improve the appearance of an automobile of the type described by providing the swingable strip of a hinged finish molding with a hinge connection which is totally within the finish molding structure when the strip is in its downwardly extending position.

These and other objects of this invention will be readily apparent from the following specification and drawings, in which:

Figure 3 is an enlarged view similar to Figure 2 showing the swingable strip in its horizontally extending position when the swingable door is open;

Figure 4 is an enlarged view taken on the plane indicated by line 4—4 of Figure 1;

Figure 5 is a view taken on the plane indicated by line 5—5 of Figure 3 showing the actuating mechanism for the swingable strip; and Figure 5a is a view taken on the plane indicated by line 5—5 of Figure 3 showing the spring mechanism assisting the actuating mechanism in the operation of the swingable strip.

Figure 1:
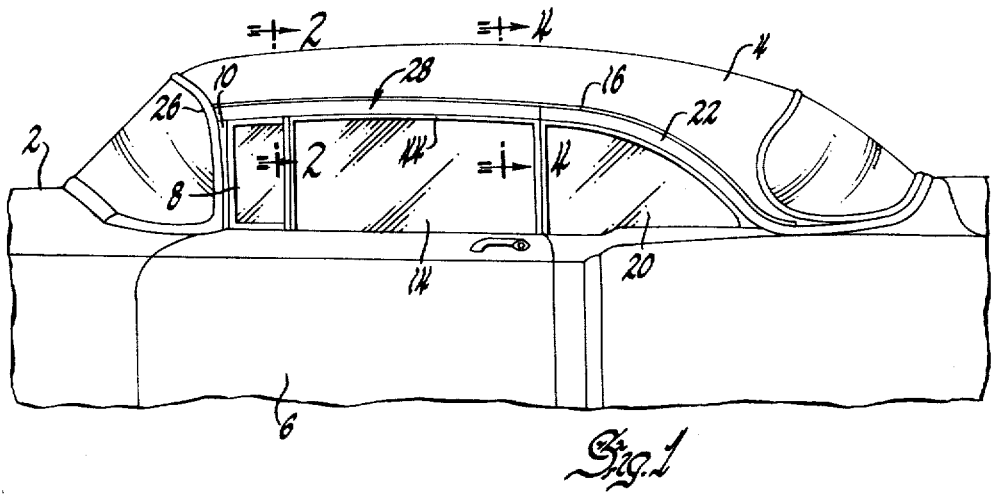
Figure 1 is a partial side view of an automobile with the hinged finish molding of this invention mounted on a door header of a swingable door.

Referring now to Figure 1, an automobile body 2 of the "hard top" type includes a roof 4 and an outwardly swinging door 6 hinged to the body at the front edge thereof. A ventilation window 8 is pivotally mounted in a frame 10 which extends upwardly from the forward portion of the door to the roof rail 12 of roof 4. In this type of automobile, door 6 does not have a window header for the vertically moving window 14, since roof rail 12 provides a door header for door 6 and also a window header for the vertically moving window 14. A drip molding 16 extends outwardly from the roof rail 12 and an ornamental molding strip 18 is provided in the interior of the vehicle. The rear quarter window 20 is provided with a glass channel by fixed finish molding 22. The edge 24 of roof 4 is slightly curved outwardly from the rear quarter area to the front pillar 26 of the vehicle. The finish molding 22, providing a glass channel for the window 20, follows this curve of the roof edge 24 and this invention now provides a hinged finish molding generally designated as 28 which continues the finish molding curve from the front end of finish molding 22 to the front pillar 26.

In Figures 2 through 5a inclusive of the drawings, the hinged finish molding 28 is shown. A supporting member 32 has a horizontal flange 34 secured to the roof rail 12 by screws 36 and a depending flange 38 having a rolled edge 40. A weather strip element 42 secured to flange 38 by rolled edge 40 engages the inner surface of an ornamental metal channel 44 which covers the top and side edges of the vertically moving window 14. A swingable strip 46 provides an outer member of the hinged finish molding and is provided on its upper edge with hinge roll 48. A complementary hinge roll 50 is provided on flange 34, and hinge rolls 48 and 50 provide a hinge connection between the swingable strip 46 and the supporting member 32. It can be seen in Figure 3 that hinge roll 48 moves inwardly within hinge roll 50 as swingable strip 46 moves to its horizontally extending position when the door is opened.

A weather strip 52 secured between the roof rail 12 and flange 34 has an edge portion 54 which overlies hinge roll 50 in either position to seal the hinge connection against dust and the elements. It can be seen that edge portion 54 will not be readily visible in either position of swingable strip 46. This feature of the invention greatly enhances the appearance of the vehicle, for swingable strip 46 is usually made of stainless steel or other brightly finished metal and the contrast between edge 54 which is usually dark rubber and the swingable strip is very easily visible. It should also be noted that no weather strip element 52 having such an edge is provided between the finish molding 22 and the rear quarter area of roof rail 12, and thus by placing edge 54 of the weather strip in a position where it cannot be readily seen, the outward appearance of the vehicle will present an unbroken finish molding line from the rear quarter window to the front pillar.

As has been stated hereinbefore, the edge 24 of roof 4 is slightly curved outwardly from the rear quarter area to the front pillar 26 and the rear quarter finish molding 22 follows this curve. The swingable strip 46 continues this curve from the front end of finish molding 22 to the front pillar 26. A comparison of Figures 2 and 4 will show that strip 46 is not parallel to the plane of window 14. The center portion strip 46 is slightly curved and the cross section of the hinged finish molding generally tapers from rear to front.

Weather strip 56 is located in opposed parallel spaced relationship to weather strip 42 by a bracket 58 having a longitudinally extending flange 60 which is parallel to the plane of movement of the window. Bracket 58 tapers inwardly from rear to front and has a beaded edge 62 which is secured to finish molding strip 46 by a similar beaded edge 64 and also has tabs 66 at its ends riveted to strip 46 at 68.

Thus, this invention provides a swingable strip which follows the finish molding curve of the vehicle body and has a hinged connection with a supporting member secured to the door header with the hinge line of this connection following the general curve of the finish molding strip. A weather strip element is carried in parallel opposed relationship to a weather strip on the depending flange of the supporting member by a tapered bracket member on the swingable strip.

Figure 2:
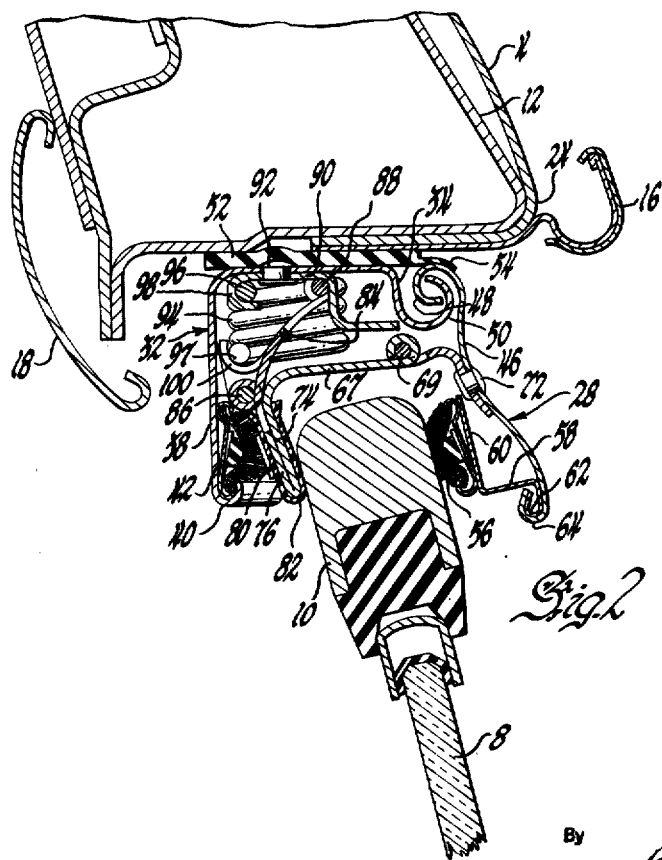
Figure 2 is an enlarged view taken on the plane indicated by line 2—2 of Figure 1.

Referring now particularly to Figures 2, 3, and 5, the actuating mechanism for the swingable strip will be described. A link 67 is hinged by pin 69 to a bracket 70 secured to swingable strip 46 by rivets 72. Link 67 has a downwardly extending portion 74 which is folded back on itself at 76. Portion 74 is secured to portion 76 by tabs 80. A plastic cover 82 is provided for portions 74 and 76. A link 84 is pivotally attached to portion 76 by pin 86 and is pivotally connected by pin 88 to a bracket 90 secured to flange 34 by rivets 92. A pair of hairpin compression springs 94 have one end 96 fixed to bracket 90 by a rolled portion 98. The other end 97 of each spring 94 is held in compression by rolled over tab members 100 on link 84. Springs 94 constantly urge link 84 outwardly about pin 88, and this action also urges link 67 outwardly about pin 86. Link 67 will then move the swingable strip 46 to its horizontally extending position as shown in Figure 3 unless an element is provided to hold springs 94 in compression. Referring now particularly to Figure 2, the top of frame 10 engages the downwardly extending portion 74 of link 67 and holds springs 94 in compression to maintain strip 46 in its downwardly extending position. By having a fixed door element engaging portion 74, the door may be opened or closed to move the swingable strip 46 to either of its positions regardless of whether the vertically sliding window is open or closed.

Referring now to Figures 4 and 5a of the drawings, the spring mechanism is shown which assists the actuating mechanism in the operation of the swingable strip. A bracket 102 is riveted to swingable strip 46. Bracket 102 has an angularly extending portion 106 terminating in a rolled edge 108. A bracket 110 fixed to flange 34 by rivets 112 is provided with a laterally extending curved portion 114 terminating in rolled edge portions 116. An over center spring 118 has one leg 120 extending through rolled edge 108 and the other leg 121 extending through rolled portions 116 of bracket 110.

As the door opens, the rearward portion of the door moves outwardly at a faster rate than the forward portion of the door. Spring 118 passes through its over center position from that shown in Figure 4 and urges the swingable strip outwardly ahead of the door so that the door does not continually strike the swingable strip as the strip moves to its horizontally extending position. As soon as the forward portion of the door begins to move away from the door header, compression springs 94 also urge the swingable strip outwardly. The swingable strip acts as a torsion member in moving between open and closed positions for it is flexible and twists about its hinge line as the door is opened and closed.

Assuming now that the door is open, as shown in Figure 3, and it is desired to close the door. As the fixed door element engages the cover 82 of portions 74 and 76 of link 67, swingable strip 46 will begin to swing downwardly about its hinge line and will be twisted about this line. As the door is closed, the forward portion of the door reaches the door header ahead of the rearward portion of the door. Therefore, mechanism must be provided for holding the rearward portion of strip 46 outwardly while the forward portion is being moved downwardly, for otherwise the rearward portion of the strip would move downwardly in the path of movement of the rearward portion of the door. Spring 118 holds the rearward portion of strip 46 outwardly until the rearward portion of the door has moved to a position adjacent the door header so that if the rearward portion of the swingable strip is then moved downwardly it will engage the outer surface of the door rather than being disposed in the path of movement of the door. As soon as the rearward portion of the swingable strip has moved to a position adjacent to its downwardly extending position, spring 118 goes over center and then urges the rearward portion of the swingable strip against the rearward portion of the door. Although only one spring mechanism has been shown for assisting the operation of the swingable strip by the actuating mechanism, obviously more such mechanisms may be used if required for a wide door.

While a specific embodiment of this invention has been shown and described, various changes and modifications may be made within the scope and spirit of the invention.

We claim:

1. A hinged finish molding for an automobile of the type including a swingable door and a door window moving vertically between open and closed positions with respect to a door header having an outwardly extending arcuate edge portion comprising, a member having longitudinally extending flanges, one of said flanges being secured to the door header and the other of said flanges depending therefrom, a swingable strip having a longitudinal curvature similar to said edge portion of said door header, hinge means connecting said strip to said member whereby said strip is disposed in variable spaced relationship to the plane of movement of said window, means constantly urging said swingable strip horizontally outwardly about said hinge means, means associated with said swingable strip and contactable by a fixed door element as said door is closed to swing said swingable strip downwardly to form a glass channel for said door window, and weather stripping on said depending flange and said swingable strip disposed in parallel opposed relationship to the plane of movement of said door window when said door is closed to provide a seal for said door window.

2. A hinged finish molding for an automobile of the type including a swingable door and a door window moving vertically between open and closed positions with respect to a door header having an outwardly extending arcuate edge portion comprising, a member having longitudinally extending flanges, one of said flanges being secured to the door header and the other of said flanges depending therefrom and having weather stripping parallel to the plane of movement of said window, a swingable strip having a longitudinal curvature similar to said edge portion of said door header, hinge means connecting said strip to said member in spaced relationship to said depending flange whereby said strip is disposed in variable spaced relationship with the plane of movement of said window, means constantly urging said swingable strip horizontally outwardly about said hinge means, means associated with said swingable strip and contactable by a fixed door element as said door is closed to swing said swingable strip downwardly to form a glass channel for said door window, a bracket member on said swingable strip having a longitudinally extending edge portion parallel to the plane of movement of said door window, and weather stripping on said edge portion in opposed spaced relationship to said weather stripping on said depending flange when said door is closed, said weather stripping on said edge portion and said depending flange providing a seal for said door window.

3. A hinged finish molding for an automobile of the type including a swingable door and a door window moving vertically between open and closed positions with respect to a door header having an outwardly extending arcuate edge portion comprising, a member having longitudinally extending flanges, one of said flanges being secured to the door header and the other of said flanges depending therefrom, a swingable strip having a longitudinal curvature similar to said edge portion of said door header, hinge means connecting said strip to said member in variable spaced relationship to the plane of movement of said window and in substantially parallel spaced relationship with said edge portion of said door header, the hinge line of said hinge means being in variable spaced relationship with the plane of movement of said door window, means constantly urging said swingable strip horizontally outwardly about said hinge means, means associated with said swingable strip and contactable by a fixed door element as said door is closed to swing said swingable strip downwardly to form a glass channel for said door window, and weather stripping on said depending flange and on said swingable strip disposed in parallel opposed relationship to the plane of movement of said door window when said door is closed to provide a seal for said door window.

4. A hinged finish molding for an automobile of the type including a swingable door and a door window moving vertically between open and closed positions with respect to a door header having an outwardly extending arcuate edge portion comprising, a member having longitudinally extending flanges, one of said flanges being secured to the door header and the other of said flanges depending therefrom, a swingable strip having a longitudinal curvature similar to said edge portion of said door header, hinge means connecting said strip to said member in variable spaced relationship to the plane of movement of said window, said hinge means including a hinge roll on said member and a complementary hinge roll on said swingable strip moving inwardly within said hinge roll on said member as said swingable strip moves outwardly about said hinge means, means constantly urging said swingable strip horizontally outwardly about said hinge means, means associated with said swingable strip and contactable by a fixed door element as said door is closed to swing said swingable strip downwardly to form a glass channel for said door window, and weather stripping on said depending flange and said swingable strip disposed in parallel opposed relationship to the plane of movement of said door window when said door is closed to provide a seal for said door window.

5. A hinged finish molding for an automobile of the type including a swingable door and a door window moving vertically between open and closed positions with respect to a door header having an outwardly extending arcuate edge portion comprising, a member having longitudinally extending flanges, one of said flanges being secured to the door header and the other of said flanges depending therefrom and having weather stripping parallel to the plane of movement of said door window, a swingable strip having a longitudinal curvature similar to said edge portion of said door header, hinge means connecting said strip to said member in variable spaced relationship to the plane of movement of said window, said hinge means including a hinge roll on said member and a complementary hinge roll on said swingable strip moving inwardly within said hinge roll on said member as said swingable strip moves outwardly about said hinge means, means constantly urging said swingable strip horizontally outwardly about said hinge means, means associated with said swingable strip and contractable by a fixed door element as said door is closed to swing said swingable strip downwardly to form a glass channel for said door window, a bracket member on said swingable strip having a longitudinally extending edge portion parallel to the plane of movement of said door window, and weather stripping on said bracket member in opposed spaced relationship to said weather stripping on said depending flange when said door is closed to provide a seal for said door window.

6. A hinged finish molding for an automobile of the type including a swingable door and a door window moving vertically between open and closed positions with respect to a door header having an outwardly extending arcuate edge portion comprising, a member having longitudinally extending flanges, one of said flanges being secured to the door header and the other of said flanges depending therefrom, a swingable strip having a longitudinal curvature similar to said edge portion of said door header, hinge means connecting said strip to said member in variable spaced relationship to the plane of movement of said window, said hinge means including a hinge roll on said flange secured to said door header and extending outwardly of said flange and a complementary hinge roll on said swingable strip moving inwardly within said flange hinge roll as said swingable strip moves outwardly about said hinge means, means constantly urging said swingable strip horizontally outwardly about said hinge means, means associated with said swingable strip and contactable by a fixed door element as said door is closed to swing said swingable strip downwardly to form a glass channel for said door window, and weather stripping on said depending flange and said swingable strip disposed in parallel opposed relationship to the plane of movement of said door window when said door is closed to provide a seal for said door window.

7. A hinged finish molding for an automobile of the type including a swingable door and a door window moving vertically between open and closed positions with respect to a door header having an outwardly extending arcuate edge portion comprising, a member having longitudinally extending flanges, one of said flanges being secured to the door header and the other of said flanges depending therefrom, a swingable strip having a longitudinal curvature similar to said edge portion of said door header, hinge means connecting said strip to said member in spaced relationship to said depending flange, said hinge means including a hinge roll on said flange secured to said door header and extending outwardly of said flange and a complementary hinge roll on said swingable strip moving inwardly within said flange hinge roll as said swingable strip moves outwardly about said hinge means, the hinge line of said hinge means being in variable spaced relationship with the plane of movement of said door window, weather stripping between said door header and said flange secured to said door header and having an edge portion contacting said hinge roll on said swingable strip to seal said hinge means, means constantly urging said swingable strip horizontally outwardly about said hinge means, means associated with said swingable strip and contactable by a fixed door element as said door is closed to swing said swingable strip downwardly to form a glass channel for said door window, and weather stripping on said depending flange and on said swingable strip disposed in parallel opposed relationship to the plane of movement of said door window when said door is closed to provide a seal for said door window.

8. A hinged finish molding for an automobile of the type including a swingable door and a door window moving vertically between open and closed positions with respect to a door header having an outwardly extending arcuate edge portion comprising, a member having longitudinally extending flanges, one of said flanges being secured to the door header and the other of said flanges depending therefrom, a swingable strip having a longitudinal curvature similar to said edge portion of said door header, hinge means connecting said strip to said member in variable spaced relationship to the plane of movement of said window, said hinge means including an open bead on said flange secured to said door header and extending outwardly of said flange with the opening of said bead facing said door header and a complementary open bead on said swingable strip fitting between said door header and said flange open bead and moving inwardly within said flange open bead as said swingable strip moves outwardly about said hinge means, means constantly urging said swingable strip horizontally outwardly about said hinge means, means associated with said swingable strip and contactable by a fixed door element as said door is closed to swing said swingable strip downwardly to form a glass channel for said door window, and weather stripping on said depending flange and said swingable strip disposed in parallel opposed relationship to the plane of movement of said door window when said door is closed to provide a seal for said door window.

9. A hinged finish molding for an automobile of the type including a swingable door and a door window moving vertically between open and closed positions with respect to a door header having an outwardly extending arcuate edge portion comprising, a member having longitudinally extending flanges, one of said flanges being secured to the door header and the other of said flanges depending therefrom, a swingable strip having a longitudinal curvature similar to said edge portion of said door header, hinge means connecting said strip to said member in variable spaced relationship to the plane of movement of said window, said hinge means including an open bead on said flange secured to said door header and extending outwardly of said flange with the opening of said bead facing said door header and a complementary open bead on said swingable strip fitting between said door header and said flange open bead and moving inwardly within said flange open bead as said swingable strip moves outwardly about said hinge means, means constantly urging said swingable strip horizontally outwardly about said hinge means, means associated with said swingable strip and contactable by a fixed door element as said door is closed to swing said swingable strip downwardly to form a glass channel for said door window, and weather stripping on said depending flange and on said swingable strip disposed in parallel opposed relationship to the plane of movement of said door window when said door is closed to provide a seal for said door window.

10. A hinged finish molding for an automobile of the type including a swingable door and a door window moving generally vertically between open and closed positions with respect to a door header comprising, a member having longitudinally extending flanges, one of said flanges being secured to said door header and the other of said flanges depending therefrom, a swingable strip, hinge means connecting said strip to said member in spaced relationship to said depending flange, said hinge means including a hinge roll on said flange secured to said door header and extending outwardly of said flange and a complementary hinge roll on said swingable strip moving inwardly within said flange hinge roll as said swingable strip moves outwardly about said hinge means, weather stripping between said door header and said flange secured to said door header and having an edge portion contacting said hinge roll on said swingable strip to seal said hinge means, means constantly urging said swingable strip horizontally outwardly about said hinge means, means associated with said swingable strip and contactable by a fixed door elements as said door is closed to swing said swingable strip downwardly to form a glass channel for said door window, and weather stripping on said depending flange and on said swingable strip disposed in parallel opposed relationship to the plane of movement of said door window when said door is closed to provide a seal for said window.

References Cited in the file of this patent

UNITED STATES PATENTS 2,631,887  Wernig _____ Mar. 17, 1953

UNITED STATES PATENT OFFICE

CERTIFICATE OF CORRECTION

Patent No. 2,791,465                                            May 7, 1957

Walter G. Schumaker et al.

It is hereby certified that error appears in the printed specification of the above numbered patent requiring correction and that the said Letters Patent should read as corrected below.

Column 6, line 37, for "contractable" read -- contactable --.

Signed and sealed this 1st day of October 1957.

(SEAL)
Attest:
KARL H. AXLINE
Attesting Officer

ROBERT C. WATSON
Commissioner of Patents